9684X
H. Allen,
Water Wheel,
Patented June 2, 1836.
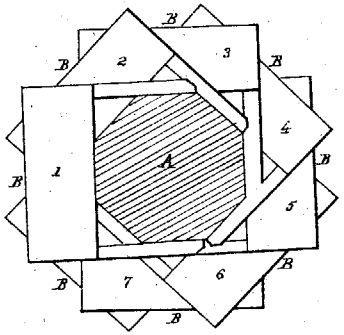
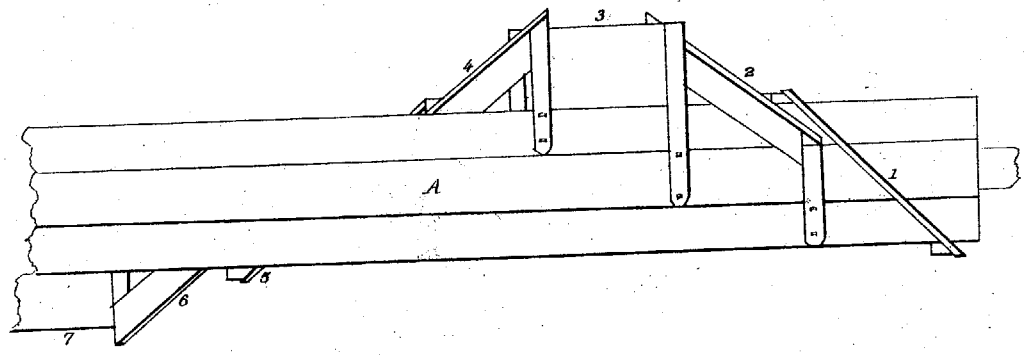
N. PETERS, PHOTO-LITHOGRAPHER, WASHINGTON, D. C.

Henry Allen, of Lincoln, Tennessee.
Letters Patent — Patented June 2, 1836.
The Schedule referred to in these Letters Patent and making
part of the same, containing a description in the words of the said
Henry Allen himself of his improvement in the current wing
wheel.
To all to whom these Presents shall come. Be it known, that I
Henry Allen in the County of Lincoln, & State of Tennessee, have
invented a new and useful horizontal, current water wheel, and that
the following is an exact and full description thereof — I have a hori-
zontal shaft sufficiently long to contain as many set of wings as may be
deemed necessary for the power required — The shaft is dressed
to eight or ten squares, to each set of wings there are two sets of
arms, locked round the shaft sufficiently strong to support the
wings when in operation — The front or upper set of arms com-
mence from the lower square of the shaft, the second set from
the top of the shaft and are so arranged as to form an angle
of forty five degrees with the horizon, when the arm is bevelled
off to receive the wing, in this way the arms are carried round
the shaft until the wheel is completed _ with the first set of
wings — The second set is shifted half a square and framed
round the shaft in the same way, the third set is again brought
to the square as the first, and so on till the number required be
framed to the shaft — This wheel is strongly confined down by
cast iron pedestals, the one at the lower end is so cast as to sup-
port the end of the gudgeon, at the upper end of the shaft there
is a crank working a pitman, which is connected to a lever
resting on a pivot in the centre, which works another pitman and
crank of the size of the first, and carries the power to the machi-
nery. A set of mitre wheels with an upright shaft will supersede
the necessity of the lever and pitman. The framing for this
wheel, should be strong and heavy and confined to the bottom of the stream with iron bolts sufficiently strong to prevent its being
moved by high water — The inside of the frame is made concave
to fit the wing as high as the centre of the wheel, or the wheel may
be rimmed and lined on the inside of the rimming so as to re-
ceive the full force and pressure of the current — A wing dam to
throw a sufficient quantity of water into the wheel is all that
is necessary, it will run at all stages of the water, if calculated
at low water mark, strong pivot gates the posts of which extend
above high water mark will put it in motion, and stop the
whole at pleasure.

What I claim as my invention and which I desire to secure by
Letters Patent consists in the water wheel as before described.

H. Allen

Witnesses
Wm. P. Elliot
C. Thos. Johns
Exd. W.G.C.

Drawing Made (572 [illegible])